(12) United States Patent
Nasreddine et al.

(10) Patent No.: US 7,741,392 B2
(45) Date of Patent: Jun. 22, 2010

(54) RUBBER COMPOSITIONS HAVING IMPROVED PHYSICAL AND LOW TEMPERATURE PROPERTIES

(75) Inventors: Victor Nasreddine, Cranberry, PA (US); Lorenzo Ferrari, Bright's Grove (CA); Sharon Guo, Shanghai (CN)

(73) Assignee: LANXESS Inc., Sarnia, Ontario (CA)

( * ) Notice: Subject to any disclaimer, the term of this patent is extended or adjusted under 35 U.S.C. 154(b) by 542 days.

(21) Appl. No.: 11/360,066

(22) Filed: Feb. 23, 2006

(65) Prior Publication Data

US 2007/0197702 A1    Aug. 23, 2007

(51) Int. Cl.
*B60C 1/00* (2006.01)
*C08K 5/24* (2006.01)

(52) U.S. Cl. ............... 524/261; 524/366; 524/414; 524/555

(58) Field of Classification Search ........... 524/261, 524/366, 414, 555
See application file for complete search history.

(56) References Cited

U.S. PATENT DOCUMENTS

| | | | | |
|---|---|---|---|---|
| 3,034,509 A | 5/1962 | Bernstein et al. | ............ | 128/348 |
| 3,485,787 A | 12/1969 | Haefele et al. | ............ | 260/33.6 |
| 3,811,933 A * | 5/1974 | Uffner et al. | ............ | 428/422 |
| 3,830,767 A | 8/1974 | Condon et al. | ......... | 260/28.5 B |
| 4,123,409 A | 10/1978 | Kaelble | ............ | 260/29.1 SB |
| 4,386,179 A | 5/1983 | Sterling | .............. | 524/269 |
| 4,983,678 A | 1/1991 | Saito et al. | ............ | 525/193 |
| 5,061,759 A | 10/1991 | Tommasi et al. | ......... | 525/326.3 |
| 5,128,773 A | 7/1992 | Sato | ............ | 358/332 |
| 5,143,963 A | 9/1992 | Sterling et al. | ............ | 524/366 |
| 5,208,294 A | 5/1993 | Brown | ............ | 525/263 |
| 5,350,824 A | 9/1994 | Kobayashi | ............ | 528/21 |
| 5,391,627 A | 2/1995 | Araki et al. | ............ | 525/274 |
| 5,635,579 A | 6/1997 | Evans et al. | ............ | 528/37 |
| 5,777,061 A | 7/1998 | Yonek et al. | ............ | 528/45 |
| 5,824,421 A | 10/1998 | Kobayashi et al. | ......... | 428/447 |
| 5,912,291 A | 6/1999 | Sterling et al. | ............ | 524/263 |
| 6,794,438 B2 | 9/2004 | Sterling et al. | ............ | 524/462 |
| 6,841,602 B2 | 1/2005 | Sterling et al. | ............ | 524/264 |
| 2003/0171500 A1 | 9/2003 | Guo et al. | ............ | 525/329.1 |

FOREIGN PATENT DOCUMENTS

JP    60-104161    6/1985

OTHER PUBLICATIONS

Encyclopedia of Polymer Science and Engineering, vol. 17, p. 666 et seq "Vulcanization" Transitions and Relaxations to Zwitterionic Polymerization, second edition 1989.

* cited by examiner

*Primary Examiner*—Robert D. Harlan
(74) *Attorney, Agent, or Firm*—Jennifer R. Seng

(57) ABSTRACT

The present invention relates to an elastomer rubber composition containing a carboxylated rubber polymer and a fluorinated additive. The present invention is also directed to an elastomer composition containing a hydrogenated carboxylated nitrile rubber and a fluorinated additive.

19 Claims, 1 Drawing Sheet

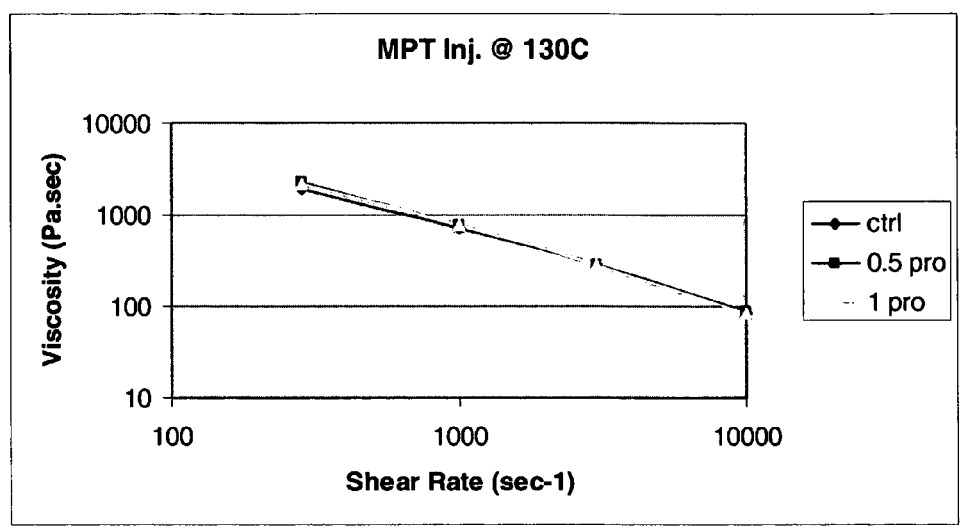
Figure The viscosity of the comparative (crtl) and Examples 4 and 5 containing 0.5 and 1phr Fluoroguard PRO respectively.

RUBBER COMPOSITIONS HAVING IMPROVED PHYSICAL AND LOW TEMPERATURE PROPERTIES

FIELD OF THE INVENTION

The present invention relates to an elastomer rubber composition containing a carboxylated rubber polymer and a fluorinated additive. The present invention is also directed to an elastomer composition containing a hydrogenated carboxylated nitrile rubber and a fluorinated additive.

Compositions according to the present invention have improved physical properties including: cure, tensile strength, tear strength, compression set, abrasion resistance, as well as improved low temperature properties.

BACKGROUND OF THE INVENTION

Carboxylated hydrogenated nitrile rubber (HXNBR), prepared by the selective hydrogenation of carboxylated acrylonitrile-butadiene rubber (a co-polymer containing at least one conjugated diene, at least one unsaturated nitrile, at least one carboxylated monomer and optionally further comonomers) is a specialty rubber which has good heat resistance, excellent ozone and chemical resistance, and excellent oil resistance. Coupled with the high level of mechanical properties of the rubber (in particular the high resistance to abrasion) it is not surprising that XNBR and HXNBR have found widespread use in the automotive (seals, hoses, bearing pads), oil (stators, well head seals, valve plates), electrical (cable sheathing), mechanical engineering (wheels, rollers) and shipbuilding (pipe seals, couplings) industries, amongst others.

Improvements in the properties of HXNBR are constantly sought, and often for this purpose new and unconventional additives and compounds are mixed or blended with HXNBR.

Fluorinated chemicals are used in several consumer, commercial, and industrial applications due to the very unique characteristics they possess such as: inertness, low surface energy, chemical resistance, low coefficient of friction, and surface lubricity. These additives are usually used in polymer compounding and are known to improve: processibility, flow, mixing quality, additives' dispersion, and compound properties such as wear and abrasion resistance. Commercially available fluorinated additives include Fluorogaurd® PRO and Fluoroguard® FSM.

SUMMARY OF THE INVENTION

Surprisingly it has been discovered that carboxylated rubber compositions containing fluorinated additives show improved cure, tensile, tear, abrasion, and compression set properties as well as improved low temperature performance demonstrated by lower brittle points and temperature retraction properties.

The present invention relates to an elastomeric composition containing at least one carboxylated rubber polymer and a fluorinated additive.

The present invention also related to an elastomeric composition containing at least one nitrile rubber polymer and a fluorinated additive.

The present invention also relates to an elastomeric composition containing carboxylated nitrile rubber polymer, which is optionally hydrogenated ("XNBR" or "HXNBR") and a fluorinated additive.

The present invention also relates to a process for the preparation of an elastomeric composition containing at least one carboxylated rubber polymer and a fluorinated additive.

Further, the present invention relates to shaped articles, such as seals, hoses, belts, bearing pads, stators, well head seals, valve plates, cable sheathing, wheels, rollers, pipe seals and couplings.

BRIEF DESCRIPTION OF THE DRAWINGS

The FIGURE illustrates the variation of the melt viscosity of a standard elastomeric formulation compared to those containing a fluorinated additive.

DETAILED DESCRIPTION OF THE INVENTION

The present invention includes the use of nitrile rubbers, preferably hydrogenated nitrile rubber, more preferably carboxylated nitrile rubbers, most preferably hydrogenated carboxylated nitrile rubbers. The present invention also includes the use of other rubbers having carboxylic groups.

As used throughout the present invention, the term "nitrile rubber" or NBR is intended to have a broad meaning and is meant to encompass a copolymer having repeating units derived from at least one conjugated diene, at least one $\alpha,\beta$-unsaturated nitrile and optionally further copolymerizable monomers.

Hydrogenated in the present invention is preferably understood by more than 50% of the residual double bonds (RDB) present in the starting nitrile polymer/NBR being hydrogenated, preferably more than 90% of the RDB are hydrogenated, more preferably more than 95% of the RDB are hydrogenated and most preferably more than 99% of the RDB are hydrogenated.

As used throughout this specification, the term "carboxylated nitrile rubber" or XNBR is intended to have a broad meaning and is meant to encompass a copolymer having repeating units derived from at least one conjugated diene, at least one $\alpha,\beta$-unsaturated nitrile, at least one alpha-beta-unsaturated carboxylic acid or alpha-beta-unsaturated carboxylic acid derivative and optionally further copolymerizable monomers.

As used throughout the present invention, the term HXNBR is intended to have a broad meaning and is meant to encompass XNBR wherein at least 10% of the residual C—C double bonds (RDB) present in the starting XNBR are hydrogenated, preferably more than 50% of the RDB present are hydrogenated, more preferably more than 90% of the RDB are hydrogenated, even more preferably more than 95% of the RDB are hydrogenated and most preferably more than 99% of the RDB are hydrogenated.

Suitable conjugated diene may be any known conjugated diene such as a $C_4$-$C_6$ conjugated diene. Preferred conjugated dienes include butadiene, isoprene, piperylene, 2,3-dimethyl butadiene and mixtures thereof. More preferred $C_4$-$C_6$ conjugated dienes are butadiene, isoprene and mixtures thereof. The most preferred $C_4$-$C_6$ conjugated diene is butadiene.

Suitable $\alpha,\beta$-unsaturated nitrile may be any known $\alpha,\beta$-unsaturated nitrile, such as a $C_3$-$C_5$ $\alpha,\beta$-unsaturated nitrile. Preferred $C_3$-$C_5$ $\alpha,\beta$-unsaturated nitriles include acrylonitrile, methacrylonitrile, ethacrylonitrile and mixtures thereof. The most preferred $C_3$-$C_5$ $\alpha,\beta$-unsaturated nitrile is acrylonitrile.

Suitable $\alpha,\beta$-unsaturated carboxylic acid may be any known $\alpha,\beta$-unsaturated acid copolymerizable with the diene (s) and the nitile(s), such as acrylic, methacrylic, ethacrylic, crotonic, maleic, fumaric or itaconic acid. Acrylic and methacrylic are preferred.

The α,β-unsaturated carboxylic acid derivative may be any known α,β-unsaturated acid derivative copolymerizable with the diene(s) and nitile(s), such as esters, amides and anhydrides, preferably esters and anhydrides of acrylic, methacrylic, ethacrylic, crotonic, maleic, fumaric or itaconic acid.

Preferably, HXNBR contains in the range of from 39.1 to 80 weight percent of repeating units derived from one or more conjugated dienes, in the range of from 5 to 60 weight percent of repeating units derived from one more unsaturated nitriles and 0.1 to 15 percent of repeating units derived from one or more unsaturated carboxylic acid or acid derivative. More preferably, the HXNBR contains in the range of from 60 to 70 weight percent of repeating units derived from one or more conjugated dienes, in the range of from 20 to 39.5 weight percent of repeating units derived from one or more unsaturated nitriles and 0.5 to 10 percent of repeating units derived from one or more unsaturated carboxylic acid or acid derivative. Most preferably, the HXNBR contains in the range of from 56 to 69.5 weight percent of repeating units derived from one or more conjugated dienes, in the range of from 30 to 37 weight percent of repeating units derived from one or more unsaturated nitriles and 0.5 to 7 weight percent of repeating units derived from one or more unsaturated carboxylic acid or acid derivative. Preferably HXNBR is a statistical co-polymer with the carboxylic functions randomly distributed throughout the polymer chains.

Optionally, the HXNBR may further contain repeating units derived from one or more copolymerizable monomers. Repeating units derived from one or more copolymerizable monomers will replace either the nitrile or the diene portion of the nitrile rubber and it will be apparent to the skilled in the art that the above mentioned figures will have to be adjusted to result in 100 weight percent.

The present invention also includes the use of other rubber polymers having carboxylic groups. Suitable rubbers include XSBR styrene-butadiene copolymers and graft polymers with other unsaturated polar monomers such as acrylic acid, methacrylic acid, acrylamide, methacrylamide, N-methoxymethyl methacrylic acid amide, N-acetoxy-methyl methacrylic acid amide, acrylonitrile, hydroxyethylacrylate and/or hydroxyethylmethacrylate with styrene contents of 2-50 wt. % and containing 1-20 wt. % of polar monomers polymerized into the molecule), FKM (fluoroelastomer), ACM (poly acrylate rubber), EAM (copolymers of ethylene, methyl acrylate and a third carboxyl group-containing component currently sold under the tradename Vamac® from DuPont.)

The present invention is not restricted to a special process for preparing the hydrogenated carboxylated NBR. Preferably HXNBR is readily available as disclosed in WO-01/77185-A1. For jurisdictions allowing for this procedure, WO-01/77185-A1 is incorporated herein by reference.

The XNBR as well as the HXNBR which forms a preferred component of the elastomer of the present invention can be characterized by standard techniques known in the art. For example, the molecular weight distribution of the polymer can be determined by gel permeation chromatography (GPC) using a Waters 2690 Separation Module and a Waters 410 Differential Refractometer running Waters Millennium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

The elastomeric composition of the present invention may further contain other natural or synthetic rubbers such as BR (polybutadiene), ABR (butadiene/acrylic acid-$C_1$-$C_4$-alkylester-copolymers), EVM (ethylene vinyl acetate-copolymers), AEM (ethylene acrylate-copolymers), CR (polychloroprene), IR (polyisoprene), SBR (styrene/butadiene-copolymers) with styrene contents in the range of 1 to 60 wt %, EPDM (ethylene/propylene/diene-copolymers), FKM (fluoropolymers or fluororubbers), and mixtures of the given polymers. Careful blending with these rubbers often reduces cost of the polymer blend without sacrificing the processability. The amount of natural and/or synthetic rubbers will depend on the process condition to be applied during manufacture of shaped articles and is readily available by few preliminary experiments.

The elastomeric compositions according to the present invention can contain the carboxylated rubber polymer or nitrile rubber or the compositions according to the present invention can contain blends of the carboxylated rubber or nitrile rubber and other natural or synthetic rubber polymers.

Preferably, the nitrile rubber or carboxylated rubber is present in an amount of more than 50 parts per hundred rubber, more preferably more than 65 phr, most preferably 70 phr.

Blends of HXNBR and HNBR are preferred according to the present invention. Most preferably the elastomeric composition contains approximately 30 phr HNBR and 70 phr HXNBR, most preferably 35 phr HNBR and 65 phr HXNBR.

The elastomer according to the present invention further contains a fluorinated additive having a viscosity@50° C. between 2 and 1000 cSt (centi Stokes) and an average molecular weight between 300 and 10000, more preferable having a viscosity@50° C. between 2-500 cSt and an average molecular weight between 300 and 5000.

Suitable fluorinated additives include additives of the general formula (1):

$$R\text{--}(CH_2)_nX \tag{1}$$

wherein R is $CF_3CF_2$ $(CF_2CF_2)n$, wherein n>=2,
wherein X is a halide, such as Cl, Br or I a hydroxyl group, a carboxylic group, an acrylate, a methacrylate, a sulfonic acid or a derivative thereof.

Suitable fluorinated additives also include additives of the general formula (II)

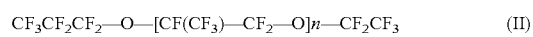

$$CF_3CF_2CF_2\text{--}O\text{--}[CF(CF_3)\text{--}CF_2\text{--}O]n\text{--}CF_2CF_3 \tag{II}$$

wherein n>2, which can be "linear or branched".

The preferred fluoroadditives may also be functionalized with a hydroxyl group, a carboxyl group, an acrylate, a methacrylate, a sulfonic acid phosphate, a silane, an ammonium salt(s) or a derivative thereof.

Preferably, the fluorinated additive is added in quantities which range from about 0.1 to 1, parts per hundred parts rubber and more preferably from about 0.5 to about 1.

The present inventive elastomer composition can further contain at least one filler. The filler may be an active or an inactive filler or a mixture thereof. Suitable fillers include:

highly dispersed silicas, prepared for example by the precipitation of silicate solutions or the flame hydrolysis of silicon halides, with specific surface areas of in the range of from 5 to 1000 m²/g, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 m$^2$/g and primary particle diameters in the range of from 10 to 400 nm;

natural silicates, such as kaolin and other naturally occurring silica;

glass fibers and glass fiber products (matting, extrudates) or glass microspheres;

carbon blacks; the carbon blacks to be used here are prepared by the lamp black, furnace black or gas black process and have preferably BET (DIN 66 131) specific surface areas in the range of from 20 to 200 m$^2$/g, e.g. SAF, ISAF, HAF, FEF or GPF carbon blacks;

rubber gels, especially those based on polybutadiene, butadiene/styrene copolymers, butadiene/acrylonitrile copolymers and polychloroprene; or mixtures thereof.

magnetoplumbite-structure ferrite particles such as barium ferrite particles, strontium ferrite particles or barium-strontium ferrite particles having an average particle size of from 0.1 to 20.0 μm, a BET specific surface area of from 1 to 10 m/g, and a coercive force (iHc) of from 1,500 to 7,000 Oe, powdered, optionally modified with organic modifiers, smectite clays, such as sodium or calcium montmorillonite, or synthetic clays such as hydrotalcite and laponite.

Examples of useful mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the preferred mineral is silica, especially silica made by carbon dioxide precipitation of sodium silicate. Dried amorphous silica particles suitable for use in accordance with the invention may have a mean agglomerate particle size in the range of from 1 to 100 microns, or, for example, between 10 and 50 microns or, further for example, between 10 and 25 microns. According to the present invention, less than 10 percent by volume of the agglomerate particles should be below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the tradenames HiSil 210, HiSil 233 and HiSil 243 from PPG Industries Inc. Also suitable are Vulkasil S and Vulkasil N, from LANXESS Deutschland GmbH.

The suitable filler may be present in an amount customary in the art, preferably in an amount from 1-200 phr, more preferably 10-120 phr and most preferably 20-80 phr. If the filler is silica it may be preferable for the silica to be added to the composition in an amount from 1-50 phr, more preferably 5-25 phr.

Often, use of carbon black as a filler is preferable. Usually, carbon black is present in the elastomer composition in an amount of in the range of from 0.1 to 200 phr, preferably 10 to 100, more preferably 40 to 80 phr. Further, it might be advantageous to use a combination of carbon black and mineral filler in the inventive polymer composite. In this combination the ratio of mineral fillers to carbon black is usually in the range of from 0.05 to 20, preferably 0.1 to 10.

The rubber elastomer according to the present invention can contain further auxiliary products for rubbers, such as reaction accelerators, vulcanizing agents, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are, e.g., from 0.1 to 50 wt. %, based on rubber.

According to the present invention, the composition can contain in the range of 0.1 to 20 phr of an organic fatty acid as an auxiliary product, such as a unsaturated fatty acid having one, two or more carbon double bonds in the molecule which more preferably includes 10% by weight or more of a conjugated diene acid having at least one conjugated carbon-carbon double bond in its molecule. Those fatty acids can have in the range of from 8-22 carbon atoms, or for example from 12-18. Examples include stearic acid, palmitic acid and oleic acid and their calcium-, zinc-, magnesium-, potassium- and ammonium salts.

According to the present invention, the composition can contain in the range of 5 to 50 phr of an acrylate as an auxiliary product. Suitable acrylates are known from EP-A1-0 319 320, in particular p. 3, l. 16 to 35, from U.S. Pat. No. 5,208,294, see Col. 2, l. 25 to 40, and from U.S. Pat. No. 4,983,678, in particular Col. 2, l. 45 to 62. Reference is made to zinc acrylate, zinc diacrylate or zinc dimethacrylate or a liquid acrylate, such as trimethylolpropane-trimethacrylate (TRIM), butanedioldimethacrylate (BDMA) and ethylenglycoldimethacrylate (EDMA). It might be advantageous to use a combination of different acrylates and/or metal salts thereof. It may also be advantageous to use metal acrylates in combination with a Scorch-retarder such as sterically hindered phenols (e.g., methyl-substituted aminoalkylphenols, such as 2,6-di-tert.-butyl-4-dimethylamino-methylphenol).

An antioxidant may be used in preparing a composition according to the present invention. Examples of suitable antioxidants include p-dicumyl diphenylamine (Naugard® 445), Vulkanox® DDA (a diphenylamine derivative), Vulkanox® ZMB2 (zinc salt of methylmercapto benzimidazole), Vulkanox® HS (polymerized 1,2-dihydro-2,2,4-trimethyl quinoline) and Irganox® 1035 (thiodiethylene bis(3,5-di-tert.-butyl-4-hydroxy)hydrocinnamate or thiodiethylene bis (3-(3,5-di-tert.-butyl-4-hydroxyphenyl)propionate supplied by Ciba-Geigy. Vulkanox is a trademark of Bayer AG.

Similarly, in preparing compositions according to the present invention it is useful to employ a crosslinking agent or curing agent, including commercially available agents including sulfur/sulfur accelerator systems, diamines and peroxides. Most preferred are the peroxide based vulcanizing agents due to the excellent thermal stability conveyed by the carbon-carbon linkages between polymer chains. Useful peroxide crosslinking agents, include dicumyl peroxide (Di-Cup 40KE), di-tert.-butyl peroxide, benzoyl peroxide, 2,2'-bis (tert.-butylperoxy diisopropylbenzene (Vulcup® 40KE), benzoyl peroxide, 2,5-dimethyl-2,5-di(tert-butylperoxy)-hexyne-3,2,5-dimethyl-2,5-di(benzoylperoxy)hexane, (2,5-bis(tert.-butylperoxy)-2,5-dimethyl hexane and the like. Preferred curing agents are readily determined by means of a few preliminary experiments, which is within the scope of one skilled in the art. A preferred peroxide curing agent is commercially available under the tradename Di-Cup 40KE. The peroxide curing agent (60% active) is suitably used in an amount of 0.1 to 15 parts per hundred parts of rubber (phr), preferably 4 to 10 phr. Too much peroxide may lead to undesirably violent reaction.

The crosslinking agent may also be a difunctional or polyfunctional additive containing a functionality capable of forming a derivative of a carboxyl group, such as an amine, epoxy or an isocyanate. Preferably such crosslinking agents are added to the composition in an amount of 0.1 to 15 phr, preferably 4 to 10 phr. Such crosslinking agents can also be used in combination with a peroxide curing agent.

Vulcanizing co-agents can also be added to the composition of the present invention. Mention is made of triallyl isocyanurate (TAIC), commercially available under the trademark DIAK 7 from DuPont Or N,N'-m-phenylene dimaleimide know as HVA-2 (DuPont Dow), triallyl cyanurate (TAC) or liquid polybutadiene known as Ricon® D 153 (supplied by Ricon Resins). Amounts can be equivalent to the peroxide curative or less, preferably equal.

The present invention also includes the use of activators such as zinc peroxide (50% on an inert carrier) using Struktol® ZP 1014 in combination with the peroxide. Amounts can be from 0.1 to 15, preferably from 4 to 10 phr.

The ingredients of the elastomer composition can be mixed together, suitably at an elevated temperature that may range from 25° C. to 200° C. Normally the mixing time does not exceed one hour and a time in the range from 2 to 30 minutes is usually adequate. Mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

The elastomeric composition according to the present invention is especially suitable for injection molding shaped articles such as seals, hoses, bearing pads, stators, well head seals, valve plates, cable sheathing, wheels, rollers, pipe seals and couplings.

EXAMPLES

Description of Tests

Cure Rheometry:

Vulcanization testing was carried out on a Moving Die Rheometer (MDR 2000(E)) using a frequency of oscillation of 1.7 Hz and a 1° arc at 180° C. for 60 minutes total run time. The test procedure follows ASTM D-5289.

Compound Mooney Viscosity and Scorch:

A large rotor was used for these tests in compliance with the ASTM method D-1646. The compound Mooney viscosity was determined at 100° C. by preheating the sample 1 minute and then, measuring the torque (Mooney viscosity units) after 4 minutes of shearing action caused by the viscometer disk rotating at 2 r.p.m. Mooney scorch measurements taken as the time from the lowest torque value to a rise of 5 Mooney units (t05) were carried out at 125 and 135° C.

Stress-Strain:

Samples were prepared by curing a macro sheet at 180° C. for 13 minutes. Afterwards, samples were died out into standard ASTM die C dumbbells. The test was conducted at 23° C. and complies with ASTM D-412 Method A.

Hardness:

All hardness measurements were carried out with an A-2 type durometer following the procedure outlined in ASTM D-2240.

Tear Resistance:

A tensile sheet cured 14 minutes at 180° C. was used to prepare appropriate samples of Die B and Die C geometries. Both tests were designed to give an indication of the resistance to tear of the rubber. The test procedure complied with ASTM D 624.

Din Abrasion:

Abrasion resistance was determined according to test method DIN 53 516. The volume loss was determined by rubbing the rubber specimen with an emery paper of defined abrasive power.

Compression Set:

This test was performed in compliance with ASTM D395 (Method B). Solid button type samples were cured for 20 minutes at 180° C. and the sample was subjected to a 10% compression deflection during hot air aging.

Preparations of Examples

A laboratory size Banbury BR-82 (1.6 L capacity) internal mixer cooled at 30° C. was used to prepare the Examples. Rotor speed was held constant during mixing at 50 rpm. At 0 seconds, all 1A (See Table 1) ingredients were added. At 60 seconds, the 1B ingredients were added to the mixer. (See Table 1) A sweep was performed at 200 seconds and finally the mix was dumped at 360 seconds. The dropped mix was allowed to cool for four hours prior to addition of curatives. The curatives (2A ingredients) (See Table 1) were both then added on a 10" by 20" two roll mill cooled at 30° C.

The formulations used were based on the recipes according to Table 1, all quantities are based per one hundred parts rubber.

TABLE 1

| | | Formulations | | | | |
|---|---|---|---|---|---|---|
| | | Comp. | Ex. 1 | Ex. 2 | Ex. 3 | Ex. 4 |
| FLUOROGUARD ® FSM | 1A | — | 0.5 | 1 | — | — |
| FLUOROGUARD ® PRO | 1A | — | — | — | 0.5 | 1 |
| STEARIC ACID EMERSOL ® 132 NF | 1A | 1.5 | — | — | — | — |
| THERBAN ® XT VP KA 8889 | 1A | 100 | 100 | 100 | 100 | 100 |
| CARBON BLACK, N 660 STERLING-V | 1B | 50 | 50 | 50 | 50 | 50 |
| NAUGARD ® 445 | 1B | 1 | 1 | 1 | 1 | 1 |
| PLASTHALL ® TOTM | 1B | 5 | 5 | 5 | 5 | 5 |
| DIAK #7 | 2A | 2.5 | 2.5 | 2.5 | 2.5 | 2.5 |
| STRUKTOL ® ZP 1014 | 2A | 4.5 | 4.5 | 4.5 | 4.5 | 4.5 |
| VULCUP 40KE | 2A | 10 | 10 | 10 | 10 | 10 |

Fluoroguard ® PRO: is a low molecular weight perfluoropolyether from DuPont.
Fluoroguard ® FSM: is a functionalized version (carboxylic acid) of the Fluoroguard ® PRO from DuPont
Stearic Acid Emersol ® 132 NF is a process aid from Henkel
Therban ® XT VP KA 8889 from Lanxess AG
Carbon Black N 660 available from Cabot Tire Blacks.
Naugard ® 445 is a diphenylamine A/O available from Crompton.
Plasthall ® TOTM (Trioctyl Trimellitate) is a plasticizer from C. P. Hall.

TABLE 1-continued

Formulations

|  | Comp. | Ex. 1 | Ex. 2 | Ex. 3 | Ex. 4 |
|---|---|---|---|---|---|

Diak 7 (Triallyl isocyanurate) is a coagent from DuPont.
Struktol ® ZP 1014 is a zinc peroxide (50% on an inert carrier) activator available from Struktol Canada Ltd.
Vulcup ® 40 KE (2,2-bis(t-butylperoxy)diisopropylbenzene), 40% peroxide.

TABLE 2

Properties

| | Comp. | Ex. 1 | Ex. 2 | Ex. 3 | Ex. 4 |
|---|---|---|---|---|---|
| Cure | | | | | |
| Maximum torque ($M_H$), 180 C. (dN · m) | 49.89 | 52.2 | 50.58 | 52.59 | 51.35 |
| Minimum torque ($M_L$), 180 C. (dN · m) | 1.98 | 2.19 | 2.06 | 2.19 | 2.08 |
| Delta Torque ($M_H - M_L$) | 47.91 | 50.01 | 48.52 | 50.4 | 49.27 |
| T' 90 (min) | 6.35 | 5.83 | 5.94 | 6.09 | 6.01 |
| Scorch and Mooney | | | | | |
| Mooney scorch, t05 (min), 125 C. | >30 | >30 | >30 | >30 | >30 |
| Mooney scorch, t05 (min), 135 C. | 12.22 | 11.9 | 12.36 | 11.75 | 11.73 |
| ML (1 + 4) @ 100 C., MU | 74 | 80 | 78 | 80 | 78 |
| ML (1 + 4) @ 130 C., MU | 41 | 45 | 43 | 45 | 43 |
| Stress-strain 23 C. | | | | | |
| Hardness Shore A2 (pts.) | 72 | 71 | 71 | 71 | 71 |
| Ultimate Tensile (MPa) | 26 | 23 | 26 | 27 | 28 |
| Ultimate Elongation (%) | 163 | 170 | 175 | 170 | 176 |
| Stress @ 50 (Mpa) | 4.7 | 4.1 | 3.8 | 4.1 | 4.2 |
| Stress @ 100 (Mpa) | 14.2 | 13.2 | 12.4 | 13.2 | 13.0 |
| 150 C. | | | | | |
| Hardness Shore A2 (pts.) | 69 | 69 | 69 | 69 | 68 |
| Ultimate Tensile (MPa) | 11 | 11 | 12 | 15 | 13 |
| Ultimate Elongation (%) | 104 | 104 | 114 | 123 | 110 |
| Stress @ 50 (MPa) | 3.2 | 3.3 | 3.2 | 3.5 | 3.4 |
| Stress @ 100 (MPa) | 10.1 | 10.3 | 10.0 | 11.0 | 11.0 |
| Compression Set | | | | | |
| 70 hrs/100 C. | 14 | 13 | 14 | 13 | 12 |
| 24 hrs/135 C. | 19 | 18 | 16 | 14 | 15 |
| 70 hrs/150 C. | 30 | 29 | 29 | 27 | 28 |
| Die B Tear, Tear Strength (kN/m) | 48 | 62 | 67 | 66 | 60 |
| Die C Tear, Tear Strength (kN/m) | 30 | 28 | 31 | 30 | 29 |
| Din Abrasion, Abrasion Volume Loss (mm$^3$) | 75 | 66 | 64 | 69 | 69 |
| Air Aging | | | | | |
| 168 hrs/135 C. | | | | | |
| Chg. Hard. Shore A2 (pts.) | 9 | 10 | 10 | 10 | 9 |
| Chg. Ulti. Tens. (%) | 13 | 28 | 12 | 10 | 12 |
| Chg. Ulti. Elong. (%) | −34 | −40 | −42 | −39 | −42 |
| 168 hrs/150 C. | | | | | |
| Chg. Hard. Shore A2 (pts.) | 14 | 14 | 14 | 13 | 15 |
| Chg. Ulti. Tens. (%) | 9 | −1 | 12 | 11 | 5 |
| Chg. Ulti. Elong. (%) | −58 | −68 | −59 | −58 | −61 |
| Stress-strain (in IRM903) | | | | | |
| 168 hrs/135 C. | | | | | |
| Chg. Hard. Shore A2 (pts.) | 3 | 5 | 5 | 5 | 5 |
| Chg. Ulti. Tens. (%) | −17 | −3 | −10 | −7 | −8 |
| Chg. Ulti. Elong. (%) | −37 | −44 | −41 | −40 | −43 |
| Vol. Change (%) | 7.6 | 8.2 | 8.1 | 7.9 | 8.1 |
| 168 hrs/150 C. | | | | | |
| Chg. Hard. Shore A2 (pts.) | 4 | 6 | 6 | 6 | 5 |
| Chg. Ulti. Tens. (%) | −28 | −3 | −22 | −36 | −31 |
| Chg. Ulti. Elong. (%) | −46 | −50 | −52 | −55 | −54 |
| Vol. Change (%) | 7.9 | 8.1 | 8.7 | 9 | 8.8 |
| Brittle point (C.) | −48 | −52 | −49 | −48 | −48 |

TABLE 2-continued

| Properties | Comp. | Ex. 1 | Ex. 2 | Ex. 3 | Ex. 4 |
|---|---|---|---|---|---|
| Temperature Retraction | | | | | |
| TR 10 [%], C. | −22 | −22 | −22 | −22 | −22 |
| TR 70 [%], C. | −10 | −13 | −11 | −12 | −11 |

The physical properties clearly improve with the addition of the fluoroadditive as illustrated in Table 2. The addition of the this additive leads to an increased torque ($M_H$-$M_L$), a faster cure as seen for the lower value of T90 from MDR, and no adverse effect on the scorch resistance. Faster cure times lead generally to quicker cycle times and a subsequent increase in productivity. Although the Mooney slightly increases when the additive is used, the melt viscosity data at different shear rates typical of polymer processing shows no adverse effect on flow and processibility characteristics.

The compositions of the present invention also show increased tensile at high testing temperatures, a higher retention of physical properties at high temperatures (ex: retention in Modulus at 100% elongation), and higher Die B Tear values. Moreover, there is an appreciable improvement in compression set values (lower), an increase in abrasion resistance as seen in the DIN testing. The fluoroadditives used also seem to improve the low temperature properties as seen from the temperature retraction testing (lower, TR70) as well as the lower brittle points for the Fluoroguard FSM compared to the control. The additive also has no adverse on the air aging properties and is not extractable after fluid aging as seen from the slightly increased volume swell %.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. An elastomeric composition comprising a fluorinated additive and a carboxylated rubber selected from the group consisting of XNBR, HXNBR, FKM, ACM, EAM and blends thereof.

2. The composition according to claim 1, wherein carboxylated rubber is XNBR.

3. The composition according to claim 1, wherein the carboxylated rubber is HXNBR.

4. The composition according to claim 1, wherein the fluoroadditive is present in an amount from 0.1-1 phr.

5. The composition according to claim 4, wherein the fluoroadditive is present in an amount for 0.5 to 1 phr.

6. The composition according to claim 1, wherein the fluorinated additive is of the general Formula 1

R~(CH$_2$)$_n$X    (1)

wherein R is CF$_3$CF$_2$ (CF$_2$CF$_2$)$_n$
wherein $_n$≧2 and wherein X is a halide selected from the group consisting of Cl Br and I, a hydroxyl group, a carboxyl group, an acrylate, a methacrylate, a sulfonic acid or a derivative thereof.

7. The composition according to claim 1, wherein the fluorinated additive of the general formula (II)

CF$_3$CF$_2$CF$_2$—O—[CF(CF$_3$)—CF$_2$—O]$_n$—CF$_2$CF$_3$ wherein n≧2.

8. The composition according to claim 6 wherein the fluorinated additive is functionalized with a hydroxyl group, a carboxyl group, an acrylate, a methacrylate, a sulfonic acid phosphate, a silane, an ammonium salt or a derivative thereof.

9. The composition according to claim 7, wherein the fluorinated additive is functionalized with a hydroxyl group, a carboxyl group, an acrylate, a meth acrylate, a sulfonic acid phosphate, a silane, an ammonium salt or a derivative thereof.

10. The rubber composition according to claim 1, further comprising a crosslinking agent.

11. The rubber composition according to claim 10, wherein the crosslinking agent is a peroxide.

12. The rubber composition according to claim 10 wherein the crosslinking agent is an additive capable of forming a derivative of a carboxyl functionality.

13. The rubber composition according to claim 1, further comprising at least one filler.

14. The rubber composition according to claim 1, further comprising antioxidants, anti-aging agents, heat stabilizers, processing aids, plasticizers, foaming agents, reaction accelerators and/or activators, or vulcanizing accelerators.

15. A process for improving the physical and low temperature properties of an elastomer composition comprising mixing a carboxylated rubber and a fluorinated additive, wherein the carboxylated rubber is selected from the group consisting of XNBR, HXNBR, FKM, ACM, EAM and blends thereof.

16. A process for improving the tear strength, abrasion resistance, and compression set of an elastomer composition comprising mixing a carboxylated rubber and a fluorinated additive, wherein the carboxylated rubber is selected from the group consisting of XNBR, HXNBR, FKM, ACM, EAM and blends thereof.

17. A process for preparing an elastomeric composition comprising admixing a carboxylated rubber and from 0.1 to 1 parts per hundred parts rubber of a fluorinated additive, wherein the carboxylated rubber is selected from the group consisting of XNBR, HXNBR, FKM, ACM, EAM and blends thereof.

18. The process according to claim 17, wherein carboxylated rubber is XNBR.

19. The process according to claim 17, wherein the carboxylated rubber is HXNBR.

* * * * *